US007756125B2

(12) United States Patent
Sinicrope et al.

(10) Patent No.: US 7,756,125 B2
(45) Date of Patent: Jul. 13, 2010

(54) METHOD AND ARRANGEMENT FOR ROUTING PSEUDO-WIRE ENCAPSULATED PACKETS

(75) Inventors: David Sinicrope, Cary, NC (US);
Stephen Nadas, Raleigh, NC (US);
Vijay Kestur, Cary, NC (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1279 days.

(21) Appl. No.: 11/197,991

(22) Filed: Aug. 5, 2005

(65) Prior Publication Data

US 2007/0030851 A1 Feb. 8, 2007

(51) Int. Cl.
*H04L 12/28* (2006.01)
(52) U.S. Cl. .............. 370/389; 370/395.1; 370/395.3; 370/395.53; 370/400
(58) Field of Classification Search ........... 370/392, 370/396, 400, 389, 395.1, 395.3
See application file for complete search history.

(56) References Cited

U.S. PATENT DOCUMENTS

| | | | |
|---|---|---|---|
| 6,985,488 B2* | 1/2006 | Pan et al. .............. 370/395.3 |
| 7,319,699 B1* | 1/2008 | Provine et al. ........... 370/395.3 |
| 7,356,035 B1* | 4/2008 | Jayakumar et al. ....... 370/395.1 |
| 7,463,639 B1* | 12/2008 | Rekhter ...................... 370/409 |
| 7,516,224 B2* | 4/2009 | Guichard et al. ............ 709/227 |
| 7,593,398 B2* | 9/2009 | Booth et al. ................ 370/389 |
| 2003/0189898 A1* | 10/2003 | Frick et al. .................. 370/227 |
| 2004/0156313 A1* | 8/2004 | Hofmeister et al. .......... 370/229 |
| 2004/0170173 A1* | 9/2004 | Pan et al. .................... 370/392 |
| 2005/0129059 A1* | 6/2005 | Jiang et al. .................. 370/466 |
| 2005/0141504 A1* | 6/2005 | Rembert et al. ............. 370/392 |
| 2005/0213513 A1* | 9/2005 | Ngo et al. .................... 370/254 |
| 2006/0002423 A1* | 1/2006 | Rembert et al. ............. 370/466 |
| 2006/0013142 A1* | 1/2006 | Hongal et al. ............... 370/248 |
| 2006/0013226 A1* | 1/2006 | P. Ervin et al. .............. 370/392 |
| 2006/0062218 A1* | 3/2006 | Sasagawa .................... 370/389 |
| 2006/0146832 A1* | 7/2006 | Rampal et al. ............ 370/395.5 |

OTHER PUBLICATIONS

Martini et al. ("Encapsulation Methods for Transport of Ethernet Frames Over IP/MPLS Networks"); Oct. 2003; Network working Group; pp. 1-19.*
Bryant et al. ("Protocol Layering in PWE3") ; May 2002; Pseudo-Wire Edge-to-Edge (PWE3) working Group; pp. 1-33.*
Bryant et al.; (Pseudo Wire Emulation Edge-to-Edge ( PWE3) Architecture, Mar. 2005); p. 1-40.*

* cited by examiner

*Primary Examiner*—Ricky Ngo
*Assistant Examiner*—Dewanda Samuel

(57) ABSTRACT

A destination router label is added to Pseudo Wire encapsulated data packets for crossing a Multiple Protocol Label Switching (MPLS) network. Data arrives at a PW function, which performs PW encapsulation, further adding a PWE control word and a PWE label. The PW function also adds a destination router label (DRL). The DRL is configured at PW creation time with a PW control message (that is, an unsolicited LabelMap message) to a specific edge router. The packet may then be sent to a Traffic Engineering (TE) function, which uses the DRL to make the routing decision for the packet. The routing decision includes adding a PSN tunnel label to replace the DRL label for crossing the transport network. The rest of the processing is conventional PWE3 transport on MPLS; that is, when the packet is received at a second PW function, it removes the PW encapsulations and forwards the packet based on the contents of the PWE label.

13 Claims, 4 Drawing Sheets

METHOD AND ARRANGEMENT FOR ROUTING PSEUDO-WIRE ENCAPSULATED PACKETS

TECHNICAL FIELD

The present invention relates generally to data communications over the Internet, and more particularly to a method and arrangement for transporting data packets over an IP network utilizing a Multi-Protocol Label Switching tunneling technology.

BACKGROUND

In a typical Internet Protocol (IP) network, packets are sent with an IP header that describes a Layer 3 source (Open Systems Interconnection (OSI) reference model) and destination IP addresses of the packet as well as other information. At an IP hop, the router looks up the IP destination address in a routing table and the route obtained is used to send the packet toward the next hop on the way to the destination. IP routing is connectionless, that is, all routers participating in the routing domain distribute routing information to each other and packets intended for the same destination may follow different individual paths through the routers toward the destination.

A common IP network technique is "tunneling," where one packet is encapsulated into another packet by adding a new packet header (and possibly trailer). This technique is useful, for example, for sending packets over networks having different networking technologies and/or when a group of packets are all to receive the same treatment by the network.

The Multi-protocol Label Switching (MPLS) technology, a method of tunneling, provides circuit-like properties to connectionless IP networks. MPLS is commonly used as a tunneling technology, that is, MPLS tunnels are used in a wide variety of circumstances. MPLS technology encapsulates packets and attaches a label stack where the top-most label in the label stack determines the next routing decision rather than indicating an IP destination address, though it is not necessary that the data packets be IP packets. A tunneled packet, that is, the packet inside the MPLS encapsulation is not necessarily an IP packet In general, the signaling protocols used with MPLS are Reservation Protocol/Traffic Engineering (RSVP/TE), which is a variation of the Reservation Protocol (RSVP) and Label Distribution Protocol (LDP). Added services may also be signaled, such as alternate tunnel paths.

Routers in the core network examine the label stack and forward the packet according to the label's direction. The forwarding router does not look up the destination or hext hop in an address table. A destination router receives the data packet and removes the label before sending the packet on to the data's intended receiver. Traffic engineering (TE) is concerned with optimizing the use of the existing capacity of the network. For example, overloaded links are relieved of traffic pressure while underused links carry more of the traffic load. TE is also used to direct traffic with specific Quality of Service (QoS) needs toward network resources, i.e., nodes and links, which support those needs. If needed, network resources are reserved to help guarantee the QoS requested. RSVP/TE and MPLS tunnels are commonly applied in TE solutions.

Modern IP Traffic Engineering solutions incorporate Differentiated Services (DS) and combine these with MPLS (DSMPLS). This combination provides mechanisms for tracking available link bandwidths in several classes of service, which in turn, enables constraint based routing (also called constrained, shortest path first (CSPF) routing). CSPF finds paths through the network where sufficient bandwidth exists in the desired class. An MPLS tunnel may then be established along these CSPF paths. Thus, TE can be applied to different classes of traffic and the MPLS tunnels support this application by carrying traffic of one or more classes of service.

Routers are sometimes classified as provider edge (PE) and customer edge (CE) depending on whether the Internet service provider or customer operates the routers. In a traditional MPLS paradigm, PE routers provide MPLS functionality and run MPLS signaling protocols while CE routers are assumed to not have MPLS functionality. This assumption is made for two reasons. The first is backward compatibility, that is, the providers wished to use more sophisticated MPLS/TE solutions in their own networks without requiring their customers to change or upgrade the customer's CE routers. The second reason is to support more efficient scaling because the PE's could be richly meshed and this MPLS network topology could support many more CE routers than PE routers. This paradigm assumes that MPLS is used in the core but that it is not needed in the customer access networks.

Pseudo Wire Emulation Edge to Edge (PWE3) technology provides Layer 1 and Layer 2 specific emulation services over packet switched network (PSN) tunnels. Associated with PWE3 is the pseudo-wire control protocol (PWE3CTL), which is based on Label Distribution Protocol LDP. PWE3 allows a provider to offer different Layer 1 and Layer 2 services, i.e., an E1 circuit, an ATM VCC, a 100 Mb Ethernet and a Frame Relay PVC may all be offered over a common IP/MPLS core infrastructure. These are referred to as a TDM pseudo-wire (PW), an ATM VCC pseudo-wire, an Ethernet pseudo-wire and a Frame Relay pseudo-wire respectively. This is accomplished by the PWE3 pre-pending a pseudo-wire header, which is the last label on the MPLS label stack. The PW header identifies the pseudo-wire over which the encapsulated data is to be transported, which in conjunction with pseudo-wire signaling allows the remote end points of the PW to understand how the particular Layer 1 or Layer 2 encapsulation details are to be handled.

PWE3 relies on tunneling technology to transport the PWs across the MPLS/IP core. MPLS is a popular choice for this transport because of the possibility of using Diffserv aware MPLS TE tunnels, so that PWs with different characteristics can be aggregated into MPLS tunnels that support an appropriate class of service. When PWE3 uses MPLS tunnels, it also assumes the MPLS paradigm that MPLS is used in the core but is not needed in the customer access networks.

As stated above, a PE router is typically the device that offers the Layer 1 or Layer 2 services to a like customer premises device. Typically the provider offers several Layer 1 or Layer 2 emulated services and the provider is managing the resultant complexity. The equipment cost to enhance a PE router to provide the speed and the feed for each service is considerable. Each PE router used to offer the Layer 1 or 2 services must be enhanced. Typically additional PE routers must be installed to simply obtain port density needed for an additional service offering and the routing capacity of these PE routers may not be fully utilized.

In its current usage PWE3 capability is typically concentrated in a provider edge (PE) router. These routers are used to provide Layer 2 and Layer 1 services via native attachment media. (e.g., the PE router provides ATM service using an ATM port on the PE router. The ATM traffic is then encapsulated in PWE3 and transported). PE routers generally do not have the space for the volume and types of native interfaces that would be needed for cost effective service deployment. Typically, a second PE router must be added to get additional interfaces before the forwarding capacity of the first PE router is fully utilized. What is needed is a relatively inexpensive means for providing ports and interfaces to improve routing capacity, cost efficiency and scalability. At the same time this means for providing ports and interfaces must be standards compliant and backward compatible with existing PW equipment.

SUMMARY

Enhanced cost efficiency and scalability is gained when a router is separated from the PWE3 function (PWE3 and PW are used interchangeably in this specification) and one router serves many lower cost PW encapsulation functions. Native interfaces and PW encapsulation functions are separated from the router function increasing the number of interfaces that one router can handle. The cost of a PW function is magnitudes smaller than a router, which provides greater cost effectiveness and reduces the edge router requirements of the network. Separating the edge router and PW functions also allows the router capacity to be increased, independent of the PW function, providing better utilization for the router investment.

An extra label, a "destination router label" (DRL), is introduced and the PW encapsulation system adds a DRL to a PW encapsulated packet prior to sending the packet to a destination edge router. This destination router label is an ordinary MPLS label configured at PW creation time with a PW control message (that is, an unsolicited LabelMap message) on which an edge router bases its routing decision for the PW packet. In this way, the number of tunnels needed in the core network is reduced from the current need, the square of the number of PW encapsulation systems, to the square of the number of routers. TE tunnels are created between the originating and destination PW encapsulation devices. By using a DRL, the number of tunnels used for resiliency is transparent to a PW blade (circuit board) because the router handles failover. The DRL also adds little cost or complexity to the PW encapsulation systems in terms of signaling or routing cost.

BRIEF DESCRIPTION OF THE DRAWINGS

For a more complete understanding of the present invention, reference is made to the following detailed description of the invention, taken in conjunction with the accompanying drawings. Corresponding numerals and symbols in the figures refer to corresponding parts in the detailed description unless otherwise indicated.

DETAILED DESCRIPTION OF A PREFERRED EMBODIMENT

Figure 1A:
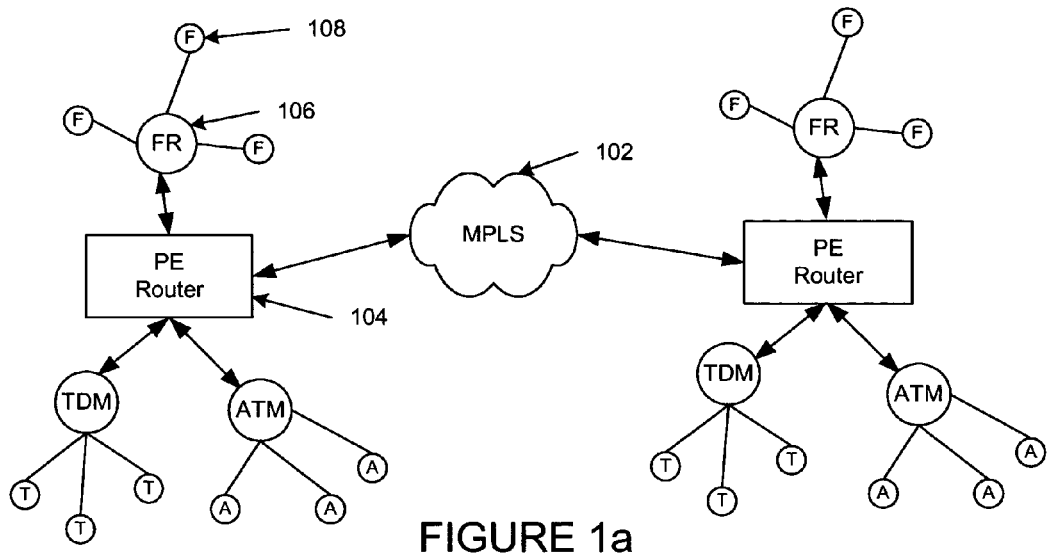
FIG. 1a depicts a high-level block diagram of a Multi-Protocol Label Switching network.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like numbers refer to like elements.

For purposes of the present disclosure, various acronyms are used, the explanation of which are listed below:

| | |
|---|---|
| ATM | Asynchronous Transfer Mode |
| CE | Customer Edge |
| CSPF | Constrained Shortest Path First |
| DRL | Destination Router Label |
| DS | Differentiated Services |
| ILM | Incoming Label Map |
| IP | Internet Protocol |
| LDP | Label Distribution Protocol |
| Mb | Mega-bit |
| MPLS | Multi-protocol Label Switching |
| NHLFE | Next Hop Label Forwarding Entry |
| PDU | Packet Data Unit |
| PE | Provider Edge |
| PW | Pseudo-wire |
| PWE3* | Pseudo Wire Emulation Edge to Edge |
| RSVP | Reservation Protocol |
| RSVP/TE | Reservation Protocol/Traffic Engineering |
| SVC | Switched Virtual Circuit |
| TE | Traffic Engineering |
| VC | Virtual Circuit |

*PW function and PWE3 will be used interchangeably throughout the description. PW may also be used as "shorthand" for PWE3

FIG. 1a depicts a high-level block diagram of network 102 incorporating Multi-Protocol Label Switching. For convenience and ease of explanation, only the Frame Relay data source and port is numbered and described. The depicted data sources and data ports transfer data to the router in the same manner as the Frame Relay function. Only the "left" side of the block diagram of the network is provided with reference numbers, as the "right" side of the network is a mirror image of the left side and functions in the same manner as the left side. In the current state of the art data arrives at Provider Edge (PE) router 104 from either or all of the Frame Relay (FR) 108 data sources. Data common to a data type such as frame relay data 108 is directed to Frame Relay port 106 in PE router 104. A Pseudo-wire label is attached by a Pseudo-Wire function (not shown), originating in PE router 104, to the data for routing through a Traffic Engineered (TE) tunnel (not shown). Though not depicted a Customer Edge router can handle the same functions as PE router 104. A Customer Edge (CE) router not shown can handle the functions of the PE router also.

Figure 1B:
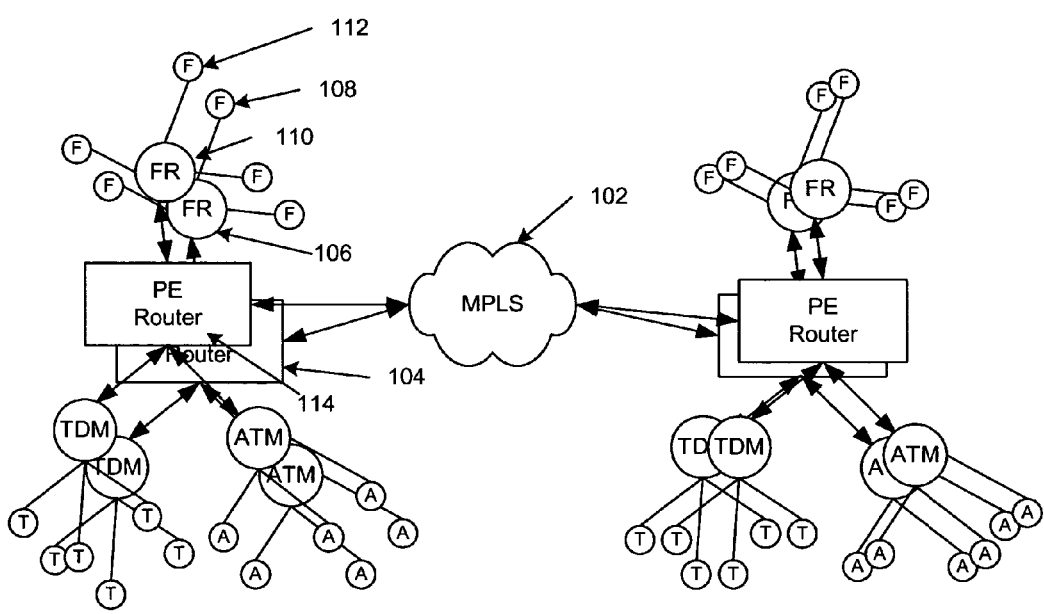
FIG. 1b illustrates a high-level block diagram of the MPLS network wherein forwarding capacity has been increased by increasing the number of PE routers.

FIG. 1b illustrates a high-level block diagram of the MPLS network wherein forwarding capacity has been increased.

The additional blocks are added to show how equipment has to be increased in order to increase capacity of the current system. As noted earlier, in order to increase capacity for more PW traffic, more PE routers have to be added. PE router 114 has been added to MPLS 102 to increase TDM, ATM and Frame Relay data input capacity. In order to simplify the illustration, only the addition of Frame Relay input 110 and Frame Relay data 112 are labeled and as illustrated both sides of the network require a doubling of equipment.

Figure 1C:
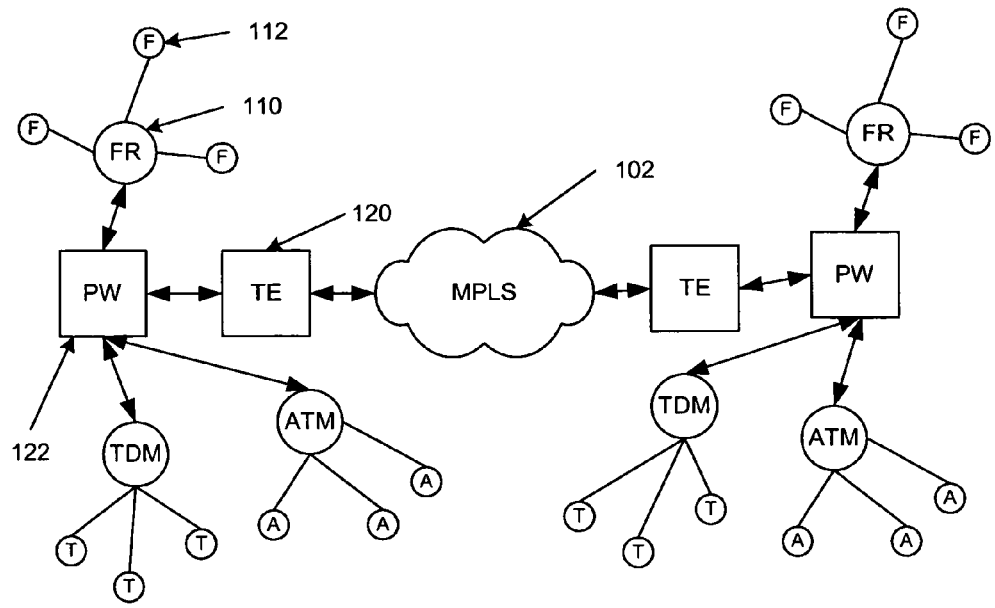
FIG. 1c depicts a high-level block diagram of an MPLS network in which a preferred embodiment of the present invention may be implemented.

FIG. 1c depicts a high-level block diagram of an MPLS network in which a preferred embodiment of the present invention may be implemented. In the present invention, PW function 122 is separated from TE function 120, which provides traffic engineered PSN tunnels 120. In the present invention, both PW function 122 and TE functions 120 are not integral with the customer edge router. The customer edge router is a "MPLS/TE aware" router and for the balance of this Description will be identified as a TE router.

Frame Relay data 112 is consolidated at Frame Relay input 110 to PW function 122. Pseudo-wires are set up between the PWE3 encapsulating input (PW function 122) and TE 120 and the encapsulated data is sent to TE function 120 over the Pseudo-wires between PW function 122 and TE function 120. Details of the functions and steps in processing the data are described in more detail below.

Figure 1D:
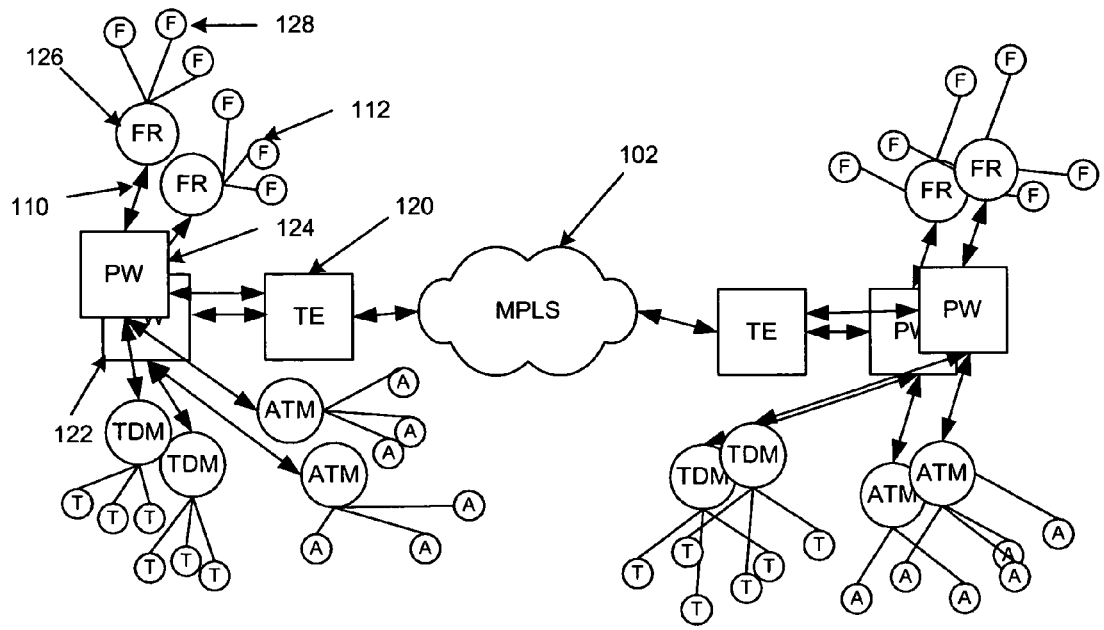
FIG. 1d illustrates a high-level block diagram of the advantages of the MPLS network when forwarding capacity has been increased in accordance with an embodiment of the present invention.

FIG. 1d illustrates a high-level block diagram of the MPLS network when forwarding capacity has been increased in accordance with an embodiment of the present invention. In the prior art, when capacity needs to be increased more equipment, i.e., a router, is added. In the present invention PW function 124 is added instead of an additional PE router. PW function 124 is magnitudes cheaper than a router. For instance, in the present invention where the PW function is a single card, data source 128 would transfer Frame Relay data to Frame Relay input 126 in PW function 124 (PW function 124 is capable of being provided on a single circuit board, or "blade"). Multiple PW blades like PW 122 and PW 124 may be utilized at a fraction of the cost of an edge router and may be added as the need for capacity increases.

Figure 2A:
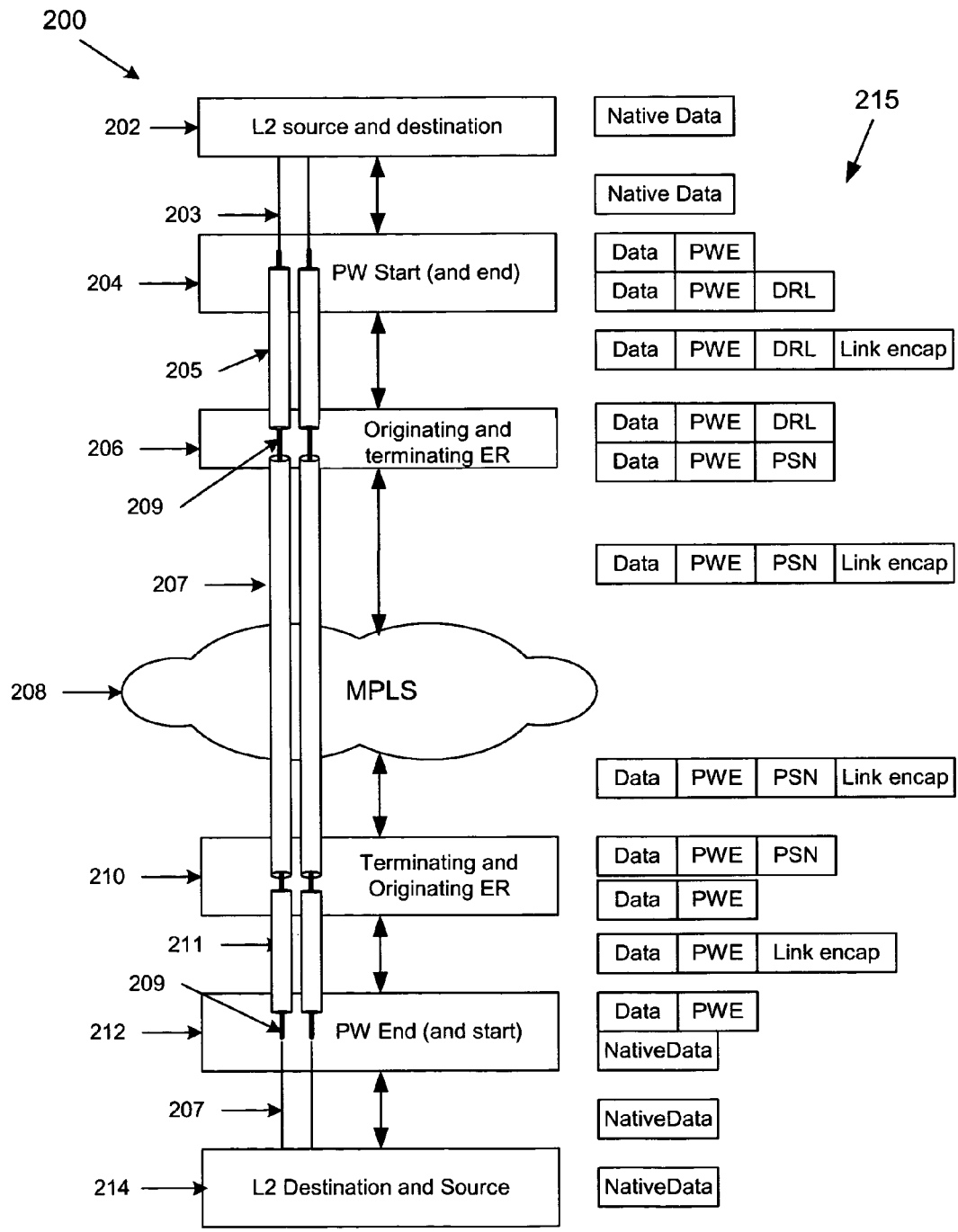
FIG. 2a depicts a block diagram of the MPLS network in accordance with a preferred embodiment of the present invention.

Reference is now made to FIG. 2a, wherein a block diagram of a MPLS/IP network is shown, denoted generally as 200, in which a preferred embodiment of the present invention may be implemented. MPLS/IP network 200 comprises an IP network utilizing MPLS technology and includes data source 202 from which native, un-encapsulated data 203, is transmitted to an input to Pseudo-Wire function 204 from Layer 2 (L2) source 202. (Note: This process also works for Layer 1 TDM technologies using processes that packetize the TDM bit streams) The data may be in any form that is suitable for transfer across the MPLS/IP network 208, including, e.g., ATM, Frame relay, etc. Un-encapsulated data 203 is sent from Layer 2 (L2) data connection 202 to PW function 204. PW function 204 performs a PW encapsulation of the data, adds a PW label (not shown) for tunneling encapsulated data 209 to edge router 206 via tunnel 205. The operation at this point may also include adding a PW control word (not shown).

Figure 2B:
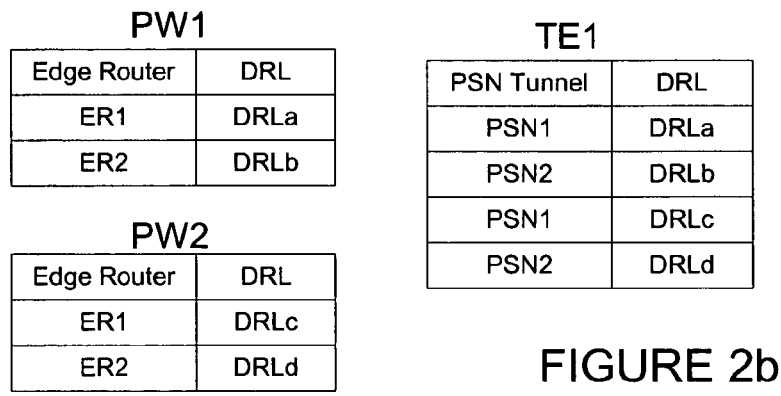
FIG. 2b shows lookup tables PW1 and PW2 mapping DRL labels to specific IP addresses for edge routers and a lookup table in the TE system for mapping DRL labels to specific PSN tunnel labels in accordance with a preferred embodiment of the present invention.

A DRL is selected from the look up table depicted in FIG. 2b, which maps the DRL to a specific IP address of a destination edge router, wherein IP address information is determined from an IP header in the data received by PW function 204 (the look up table is merely an example and does not limit the means that are utilized for mapping Destination Router Labels). PW function 204 then adds the Destination Router Label (DRL) to the PW encapsulated data (data encapsulation/de-capsulation stages 215 indicating the operations are displayed alongside the block diagram in FIG. 2. Native data corresponds to un-encapsulated data). The DRL is added to the PW encapsulated data to indicate a destination edge router for the encapsulated data without regard to which tunnel in the MPLS network is used. The DRL provides information for the tunnel encapsulator regarding the address for the destination router and the tunnel encapsulator decides which PW tunnel to use.

PW encapsulated data 209, along with the attached DRL, is then encapsulated and sent to originating edge router (ER) 206 where edge router 206 establishes and maintains Packet Switched Network (PSN) tunnel 207. Originating ER 206 inspects the DRL and uses lookup table TE1 in FIG. 2B to determine a PSN tunnel associated with destination ER 210 for which the encapsulated data is intended. After determining the identity of the PSN tunnel linked to destination ER 210, originating ER 206 strips the DRL from the encapsulated data and adds a PSN tunnel label, wherein the PSN tunnel label determines that tunnel 207 is associated with terminating ER 210.

After the PSN tunnel label is attached, PW encapsulated data 209 is sent via tunnel 207 to ER 210. Tunnel 207 may include multiple Pseudo-wires also carrying additional data. ER 210 strips the PSN tunnel label. PW encapsulated data 209 is then forwarded to destination PW function 212 via tunnel 211, where the PW label is stripped and the resultant, un-encapsulated data 203, the remaining data, is sent to destination router 214.

Note that in the disclosed system, data may originate at either end of the system. In other words, an identical arrangement accounts for data flow in the opposite direction. Thus, data flow across the MPLS network and PW function may flow either way between edge routers. In one instance PW 204 may send data to PW 212 for delivery to a particular address and in the next instance receive data from PW 212 for delivery for a connected destination.

As noted above, FIG. 2b shows lookup tables PW1 and PW2 that map DRL labels to specific IP addresses for edge routers. A lookup table in the TE system that maps DRL labels to specific PSN tunnels is also shown. Also as noted, the depicted lookup tables are simply examples of a means for mapping the DRL labels. It will be understood by those skilled in the art that mapping may be accomplished with various means without departing from the spirit and scope of the invention.

Figure 3:
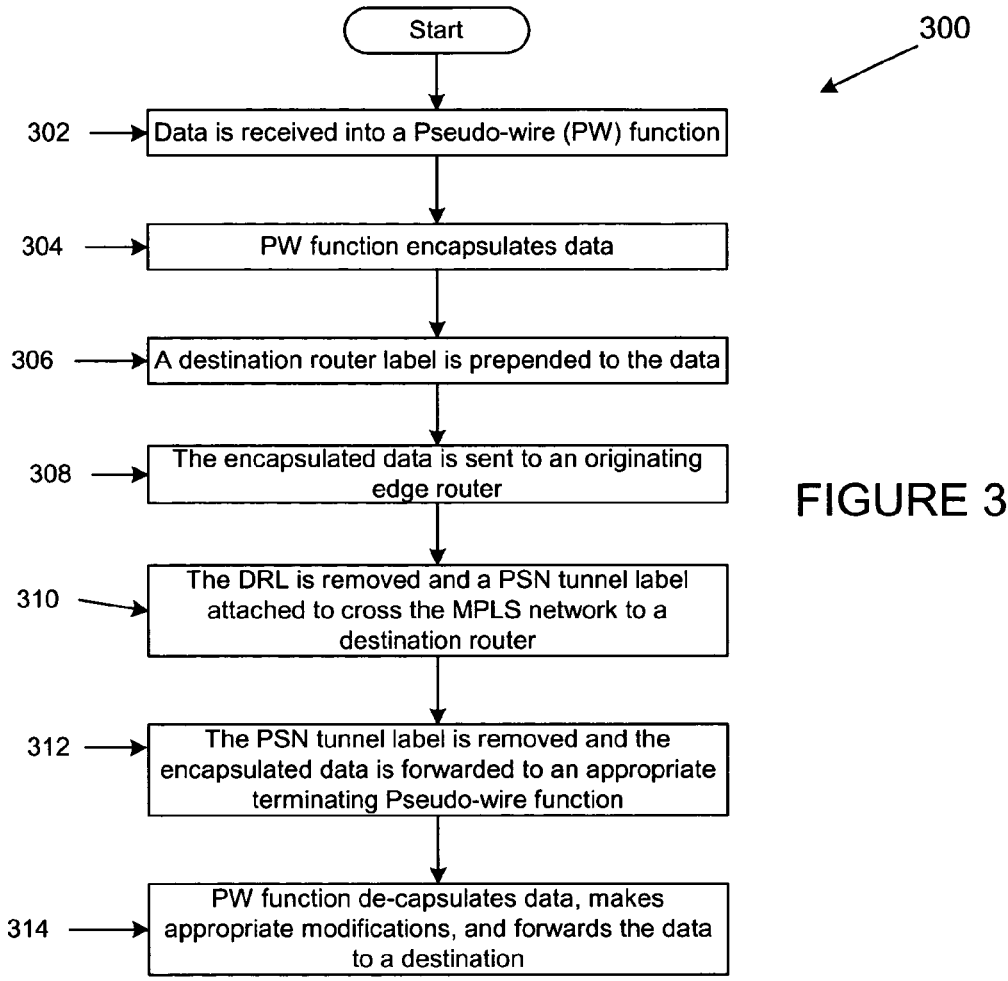
FIG. 3 illustrates a high-level flow diagram of a method for routing MPLS packets in an IP network in accordance with a preferred embodiment of the present invention.

Referring now to FIG. 3, a high-level flow diagram of a method for routing MPLS packets in an IP network is illustrated in accordance with a preferred embodiment of the present invention. Process 300 begins with step 302 depicting data being received into an input to a Pseudo-wire function input, wherein the data may be in the form of ATM, Frame relay, etc. Step 304 depicts the PW function receiving and encapsulating the data into a PW encapsulated packet. Step 306 illustrates the PW function, in addition to PW encapsulation, adding a Destination Router Label (DRL) that identifies the destination router on the other side of the MPLS/IP network. The DRL, which maps to the IP address of a destination router is determined and applied to the encapsulated data by the PW function. using the IP address of a destination router mapping it to a DRL. The DRL identifies the destination router and allows an originating router to use the DRL to choose PSN tunnels that connect the originating router and the destination router.

The process then proceeds to step 308 when the encapsulated data, including the DRL, is sent to the originating router. Next, in step 310 the originating router removes the DRL and attaches a PSN tunnel label that identifies a tunnel connecting the originating router to the destination router.

After the encapsulated data crosses the MPLS network through the assigned tunnel, the data is received into the destination edge router as illustrated in step 312. The PSN tunnel label is removed and the encapsulated data, which now includes only the PW label, is forwarded to the appropriate terminating PW function. The process then proceeds to step 314 where the PW function de-capsulates the data and makes any appropriate modifications to the un-encapsulated data prior to sending the data onto the destination connection.

The present invention has advantages over the current state of the art. The present invention scales the MPLS tunnels according to the number of PE routers, which is smaller than the number of PW functions. Solution designers are free to place the PWE3 processing near the L2 sources and decouple the PWE3 processing from the PE router. More cost effective use of the PE router is accomplished by allowing more interfaces and types of interfaces per PE router and the present invention uses the PE router's forwarding capacity more efficiently.

While the invention has been particularly shown and described with reference to a preferred embodiment, it will be understood by those skilled in the art that various changes in form and detail may be made therein without departing from the spirit and scope of the invention.

What is claimed:

1. A method for transporting data in a Multi-protocol Label Switching (MPLS)/Internet Protocol (IP) network, comprising the steps of:
   receiving un-encapsulated data at an input to a first pseudo-wire (PW) function that is coupled, via a first edge router, with the MPLS/IP network wherein the PW function performing a PW encapsulation of the received un-encapsulated data;
   adding a Destination Router Label (DRL) to the PW encapsulated data, wherein the DRL is mapped to the network address of a second edge router;
   responsive to contents of the DRL, the first edge router removing the DRL and adding a Packet Switched Network (PSN) tunnel label identifying a PSN tunnel connected with the second edge router; and
   sending the PSN labeled, PW encapsulated data to the second edge router via the identified PSN tunnel connected with the second edge router through the MPLS/IP network.

2. The method of claim 1, further comprising:
   receiving the PSN labeled, PW encapsulated data at the second edge router and removing the PSN tunnel label.

3. The method of claim , further comprising the step of:
   forwarding the PW encapsulated data to a receiving PW function, the receiving PW function
   de-capsulating the PW encapsulated data and forwarding the de-capsulated data to a receiving destination.

4. The method of claim 1, further comprising the step of:
   responsive to the contents of the PW label, de-capsulating the PW encapsulated data as an output of the pseudo-wire (PW) function, wherein the PW encapsulated data has been forwarded via the PSN tunnel to a receiving PE router through the MPLS/IP network.

5. The method of claim 1, wherein the step of receiving data at a first PW function via a first edge router, further comprises:
   sending the PW encapsulated data to the first edge router, wherein the first edge router establishes and manages Packet Switched Network (PSN) tunnels over which the PW encapsulated data is passed.

6. The method of claim 1, wherein the step of sending the PW encapsulated data to the second edge router further comprises the second edge router
   receiving the PW encapsulated data with the attached PSN tunnel label and
   removing the PSN tunnel label.

7. The method of claim 1, wherein the data comprises one or more of Frame Relay, Ethernet, ATM, TDM and PPP.

8. The method of claim 1, wherein the group of data packets comprises an IP header that includes the IP address of the destination router.

9. An arrangement for transporting data in a Multi-protocol Label Switching (MPLS)/Internet Protocol (IP) network, comprising:
   a pseudo-wire (PW) function for receiving un-encapsulated data, wherein the PW function is coupled, via a first edge router, with the MPLS/IP network and the PW function performing a PW encapsulation of the received un-encapsulated data;
   a Destination Router Label (DRL) to be added to the PW encapsulated data wherein the DRL corresponds to the network address of a second edge router;
   the first edge router being configure to remove the DRL and add a PSN tunnel label that identifies a PSN tunnel connected to the second edge router, wherein the first edge router is coupled with one or more PSN tunnels terminating at the second edge router; and
   means for sending the PSN tunnel labeled, PW encapsulated data to the second edge router through the MPLS/IP network via the identified PSN tunnel.

10. The arrangement of claim 9, further comprising:
    the second edge router being adapted for receiving the PSN tunnel labeled, PSN encapsulated data and stripping the PSN tunnel label.

11. The arrangement of claim 9, further comprising:
    means in the second router for forwarding the PW encapsulated data to an associated second PW function.

12. The arrangement of claim 9, further comprising:
    means for receiving and removing the PW encapsulation at the associated second PW function.

13. The arrangement of claim 9, further comprising:
    means for decapsulating the PW encapsulated data and sending the un-encapsulated data as an output of the second pseudo-wire (PW) function, to a receiving destination.

* * * * *

UNITED STATES PATENT AND TRADEMARK OFFICE
CERTIFICATE OF CORRECTION

PATENT NO. : 7,756,125 B2  Page 1 of 1
APPLICATION NO. : 11/197991
DATED : July 13, 2010
INVENTOR(S) : Sinicrope et al.

It is certified that error appears in the above-identified patent and that said Letters Patent is hereby corrected as shown below:

In Column 1, Line 51, delete "hext" and insert -- next --, therefor.

In Column 2, Line 64, delete "media." and insert -- media, --, therefor.

In Column 5, Line 66, delete "FIG. 2." and insert -- FIG. 2a. --, therefor.

In Column 6, Line 11, delete "FIG. 2B" and insert -- FIG. 2b --, therefor.

In Column 6, Line 58, delete "function." and insert -- function, --, therefor.

In Column 7, Line 48, in Claim 3, delete "claim ," and insert -- claims 1, --, therefor.

In Column 7, Line 55, in Claim 4, after "the", insert -- second --, therefor.

Signed and Sealed this

Nineteenth Day of October, 2010

David J. Kappos
*Director of the United States Patent and Trademark Office*